United States Patent [19]

Hillis

[11] Patent Number: 5,793,931
[45] Date of Patent: Aug. 11, 1998

[54] METHOD AND APPARATUS FOR MULTI-SENSOR, MULTI-TARGET TRACKING USING INTELLIGENT SEARCH TECHNIQUES

[75] Inventor: David Hillis, Kensington, Md.

[73] Assignee: The United States of America as represented by the Secretary of the Army, Washington, D.C.

[21] Appl. No.: 752,461

[22] Filed: Nov. 18, 1996

[51] Int. Cl.⁶ .................................................. G06F 15/42
[52] U.S. Cl. ........................................................ 395/13
[58] Field of Search ............................................ 395/13

[56] References Cited

U.S. PATENT DOCUMENTS 4,697,242  9/1987  Holland et al. .......................... 395/13

OTHER PUBLICATIONS

Carrier et al, "Multiple target tracking data association using a Genetic Algorithm", SPIE Conference, Apr. 1996.
Blackman et al, "Multiple Target Tracking with Radar Applications", Artech House, Dedham, MA, 1986.

Goldberg et al, "Genetic Algorithms in Search, Optimization, and Machine Learning", Addison–Wesley, Reading, MA, 1989.

*Primary Examiner*—George B. Davis
*Attorney, Agent, or Firm*—Paul S. Clohan; William E. Eshelman

[57] ABSTRACT

A method and apparatus wherein a Genetic Algorithm or an Evolutionary Program is used as an intelligent search technique addresses the problem of assigning sensor reports in multi-target tracking with one or more sensors. The inventive technique of tracking objects includes receiving sensor reports from at least one sensor over multiple time scans; formulating hypotheses as lists of associations between the sensor reports; constructing at least one track for each of the hypotheses; scoring each of the hypotheses; searching through a portion of the hypotheses, using an intelligent search algorithm, to find a good hypothesis; and determining the state of the tracked objects.

20 Claims, 1 Drawing Sheet

METHOD AND APPARATUS FOR MULTI-SENSOR, MULTI-TARGET TRACKING USING INTELLIGENT SEARCH TECHNIQUES

BACKGROUND OF THE INVENTION

The present invention relates in general to the problem of tracking one or more objects over time, and in particular to the problem of assigning reports from one or more sensors to tracks across multiple observation periods. It also relates to the problem of tracking multiple features on a moving elastic or inelastic object(s).

In a typical application, a tracker receives a stream of reports over time from one or more sensors (such as a radar), each of which may indicate either the detection of an actual object of interest (or closely spaced group of such objects) or a false alarm. The objects of interest may include, for example, aircraft, missiles, ships or land vehicles. The tracker may also be used to track particular points on an organ of an organism, in medical imaging applications.

The problem of assigning reports is to determine which reports correspond to which objects. For a tracker dealing with many reports collected across some time period (such that each real object may have generated two or more reports from observations at different times), the number of different ways of combining these reports into tracks (or tracks and false alarms) can grow very large. Each possible combination is called a hypothesis.

The problem of assigning reports involves searching for an optimal or near optimal hypothesis according to a metric specific to the tracker in question. In the general case, finding the optimal hypothesis for more than a small number of objects observed over time (such that each real object may have generated several reports from observations at different times) is impractical due to the high computational expense required. Therefore, suboptimal search techniques are usually employed.

Without loss of generality, we may describe the problem of assigning reports as if the sensor reports arrived in groups where each report in the group was collected over the same time period (called a "scan"). The problem of searching for an optimal or near optimal hypothesis across multiple scans is different in character from searching for the best hypothesis for the associations between reports from one scan and a set of tracks. In general, finding the local optimal assignment of objects (targets) to tracks for each scan does not guarantee that the global optimal assignment across many scans is achieved. Multi-scan, multiple target algorithms commonly used include Multi-Hypothesis Trackers (MHTs). See, for example, D. B. Reid, IEEE Transactions on Automatic Control (December 1979), pp. 843 to 854; S. S. Blackman, Multiple Target Tracking with Radar Applications (Artech House, Dedham, Mass., 1986).

A Genetic Algorithm (GA) is an artificial intelligence technique based loosely on the process of natural selection in evolutionary biology. See, for example, D. Goldberg, Genetic Algorithms in Search, Optimization, and Machine Learning (Addison-Wesley, Reading, Mass., 1989); J. Holland, Adaptation in Natural and Artificial Systems (University of Michigan Press, 1975); Z. Michalkawicz, Genetic Algorithms+Data Structures=Evolution Programs (Springer-Verlag, Berlin, 1992). The Genetic Algorithm has wide applications in optimization, intelligent search, and machine learning. See, for example, N. L. Ulder, et al, Genetic Local Search Algorithms for the Traveling Salesman, Parallel Problem Solving from Nature, 1st Workshop, Springer-Verlag, October 1990; H. C. Braun, On Solving Travelling Salesman Problems by Genetic Algorithms, Parallel Problem Solving from Nature, 1st Workshop, Springer-Verlag, Oct. 1990; G. von Lawszewski, H. Muhlenbein, Partitioning a Graph with a Parallel Genetic Algorithm, Parallel Problem Solving from Nature, 1st Workshop, Springer-Verlag, October 1990.

To apply a GA, a problem is generally expressed in such a way that potential solutions can be encoded as character strings over some alphabet. Most commonly, these character strings are binary strings, but other representations such as matrices and computer program listings can be applied. Then, a population of potential solutions called "individuals" is formed. Each individual is decoded, tested against some metric and scored. A new population is then formed by mutation (small random changes) and recombination (forming a new individual using material from a pair of parent individuals). Individuals with high scores or fitnesses are selected to be parents with a higher probability than others. The new population is then decoded and scored and the process repeated until some end condition is reached.

A genetic algorithm is NOT a succession of random searches for highly fit individuals. As the adage goes, "genes use people to make copies of themselves". What a GA really processes are substrings (not necessarily contiguous) within the individuals' character strings called "schemata".

Using the biological metaphor, an individual's string is its genotype (each character is one gene), the expressed parameter values are its phenotype, and a schema (any pattern of particular character values in particular places in the bit string) is a combination of genes. The entire string is the genotype, a substring is a schema.

A "good schema" is one that is expressed to form some subset of the solution that confers an advantage to the individual. A "good schemata" will, on the average, tend to occur in individuals with relatively high fitness values. These individuals will be selected more frequently as parents and will, in turn, produce more offspring containing that schemata.

Over a few generations, the gene pool of the population changes as good schemata crowd out lesser ones. New schemata are constantly formed and evaluated. Some of the new schemata will crowd out previously successful schemata. Over time, individuals are formed from better schema and tend to have higher fitness values. Of course, not all problems are compatible with this technique. An assumption of the technique is that, at least sometimes, schemata that are good in other contexts will remain good when combined.

While an individual represents just one total solution, the number of schema it contains is equal to the number of (not necessarily contiguous) substrings of its bit string. By sampling a relatively small number of individuals over several generations, a GA can process a huge number of schema. This inherent parallelism is key to the effectiveness of GAs.

A paper entitled "Multiple target tracking data association using a genetic algorithm", by Carrier, Leung, Lo, Litva, of McMaster Univ. Canada, was presented at the SPIE conference in Orlando in April 1996. The paper will be published in "SPIE Proceedings Vol.2739". The approach of Carrier et al is to use a GA on the single scan problem to search for the best association between a list of detections and a list of tracks. The method of Carrier et al cannot easily be extended to the multiple scan case.

SUMMARY OF THE INVENTION

It is an object of the present invention to accurately track one or more objects (targets) over time to determine the state of the object(s).

It is another object of the invention to track objects using intelligent search techniques.

These and other objects of the invention are achieved by a method of tracking at least one object comprising receiving sensor reports from at least one sensor over a window comprised of multiple time scans; formulating hypotheses as lists of associations between the sensor reports; constructing at least one track for each of the hypotheses; scoring each of the hypotheses; searching through a portion of the hypotheses, using an intelligent search algorithm, to find a good hypothesis; and determining a state of the at least one object.

In one embodiment of the invention, the intelligent search algorithm is a genetic algorithm (GA) and the invention further comprises forming a genotype for the genetic algorithm (GA) using the lists of associations such that a population in the GA comprises a group of the lists.

In another embodiment of the invention, the intelligent search algorithm is an evolutionary program.

Preferably, the good hypothesis is an optimal hypothesis across the window of multiple time scans.

The inventive method also includes tracking and determining states of multiple objects.

In a preferred embodiment, the method is performed over a sliding window of multiple time scans.

In another aspect of the invention, the method comprises receiving sensor reports from at least one sensor over a window comprised of multiple time scans; formulating hypotheses as lists of associations between the sensor reports; constructing at least one track for each of the hypotheses; scoring each of the hypotheses; searching through a portion of the hypotheses, using an intelligent search algorithm, to find a good hypothesis; determining a state of the at least one object; forming a second window of multiple time scans that overlaps the window; receiving additional sensor reports from at least one sensor over the second window; formulating new hypotheses as lists of associations between a portion of the sensor reports and the additional sensor reports; constructing at least one track for each of the new hypotheses; scoring each of the new hypotheses; searching through a portion of the new hypotheses, using an intelligent search algorithm, to find a second good hypothesis; and determining a second state of the at least one object.

Preferably, the steps of the method are repeated for multiple windows.

A further aspect of the inventive method comprises receiving sensor reports from at least one sensor over a window comprised of multiple time scans; formulating hypotheses as lists of associations between the sensor reports; constructing at least one track for each of the hypotheses; scoring each of the hypotheses; searching through a portion of the hypotheses, using an intelligent search algorithm, to find a good hypothesis; determining a state of the at least one object; forming a second window of multiple time scans that overlaps the window; receiving additional sensor reports from at least one sensor over the second window; modifying the hypotheses to add associations for the additional sensor reports and delete associations for the sensor reports that are outside the second window; constructing at least one track for each of the modified hypotheses; scoring each of the modified hypotheses; searching through a portion of the modified hypotheses, using an intelligent search algorithm, to find a second good hypothesis; and determining a second state of the at least one object.

An apparatus according to the invention comprises means for receiving sensor reports from at least one sensor over multiple time scans; means for formulating hypotheses as lists of associations between the sensor reports; means for constructing at least one track for each of the hypotheses; means for scoring each of the hypotheses; means for searching through a portion of the hypotheses, using an intelligent search algorithm, to find a good hypothesis; and means for determining a state of the at least one object.

Other objects, features and advantages of the invention will become apparent from the following detailed description taken in conjunction with the accompanying drawings.

DETAILED DESCRIPTION OF THE PREFERRED EMBODIMENTS

Figure 1:
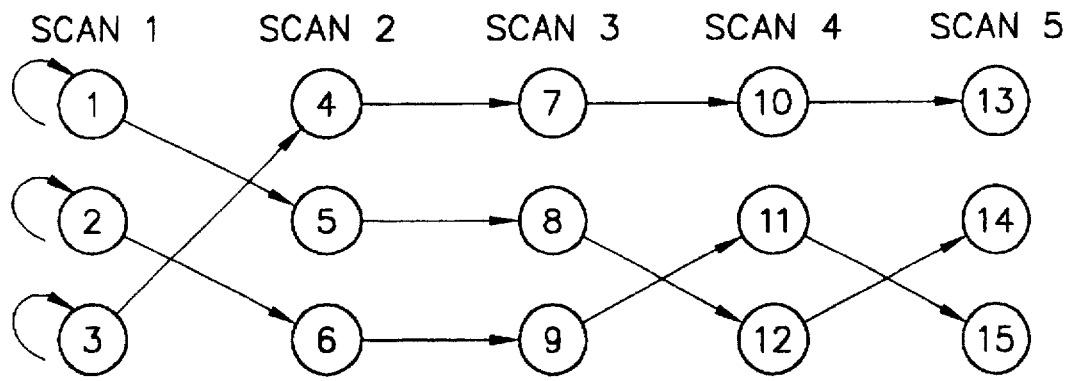
FIG. 1 shows the list of associations of Example 1 decoded as tracks.

The invention includes a method and apparatus wherein a Genetic Algorithm (GA) or an Evolutionary Program (EP) is used as an intelligent search technique to address the problem of assigning sensor reports in multi-target tracking with one or more sensors. The inventive technique comprises receiving sensor reports from at least one sensor over multiple time scans; formulating hypotheses as lists of associations between the sensor reports; constructing at least one track for each of the hypotheses; scoring each of the hypotheses; searching through a portion of the hypotheses, using an intelligent search algorithm to find a good hypothesis; and determining the state of the tracked object.

The "state" of the tracked object may include, for example, the object's position, velocity and acceleration.

The tracker "scores" hypotheses according to a metric or test specific to the tracker. A "good" hypothesis is one that has a "score" within some acceptable range for the specific application of the tracker.

When the GA is used as the intelligent search technique, the lists of associations between sensor reports is used as the genotype for a GA so that a population in the GA comprises a group of such lists. The GA is employed to search through the space of possible hypotheses for the purpose of finding a good (though quite possibly sub-optimal) hypothesis. The construction and scoring of the track(s) may be performed using standard techniques familiar to those skilled in the art of tracker design. See, for example, S. S. Blackman, Multiple Target Tracking with Radar Applications (Artech House, Dedham, Mass., 1986).

As an example, a hypothetical tracker processing the reports from two sensors will be described. Both sensors will be assumed to be "scanned" systems in that one scan of data will consist of zero or more reports all representing observations of the sensor taken at one time. Consecutive scans will consist of reports from consecutive time intervals. The inventive technique is equally applicable for different numbers of sensors which need not be scanned systems. The sensors will be assumed to process their received data and send to the tracker reports from presumed detected objects.

The tracker uses the GA to search for the best hypothesis over a sliding window of time that is, for example, five scans deep. Theoretically, the window could be large enough to hold all of the reports received since the tracker was started, but, in practice, the depth of the window chosen will reflect the anticipated behavior of the sensors and objects as well as the processing power available. A single fixed hypothesis holds the track estimates up to the start of the current window. This single fixed hypothesis cannot be changed. The GA searches the space of extensions of this fixed hypothesis across the window. At the end of the time available, the best solution found so far is used to construct a new fixed hypothesis one scan further in time. The window slides forward to include the next scan of data. (The new window overlaps the old, offset by one scan) the GA is called again to find the best hypothesis, and the process continues.

Each individual in the population represents one hypothesis and is encoded as a linked list which may be realized by an array of variable size. Each index in the array corresponds to exactly one report. The reports are sorted by time, with ties being broken arbitrarily, such that, for a given report, there are no reports at a higher index in the array with earlier times associated and is them. An element in the array is a number representing the index of another report (which may not have a higher index). The value of an element of the array is called its association and is interpreted as pointing backward to another report belonging to the same track. An array element which is the same as its own index is pointing back to itself and may be interpreted as the beginning of a new track.

EXAMPLE 1

The above-descriptive representation is illustrated by the following example. An individual is represented by the string:

1. 1
2. 2
3. 3
4. 3
5. 1
6. 2
7. 4
8. 5
9. 6
10. 7
11. 9
12. 8
13. 10
14. 12
15. 11

As shown in FIG. 1, the string is decoded into 3 tracks comprised of the points (1,5,8,12,14), (2,6,9,11,15), and (3,4,7,10,13). Point 1 has a value of 1, so it represents the beginning of a new track which we will call track 1. Point 5 has value 1, so it is pointing to point 1 and is a continuation of track 1. Point 8 has value 5, so it is pointing to point 5 and is a continuation of track 1. All of the points in the string are processed to form the tracks.

The trajectories corresponding to these tracks, along with a score representing their aggregate "goodness" are generated to form the phenotype: a hypothesis. Tracks containing few points may be interpreted as false alarms depending on the algorithms used for track construction and scoring. Note that, for an index M, in the array, the element may be any number from 1 to M. For a window with N reports, there are N! possible combinations. Note also that, while in this example, each of the points shows up in exactly one track, many hypotheses could be constructed in which 2 or more tracks have some points in common. In example 2, one value has been changed.

EXAMPLE 2

1. 1
2. 2
3. 3
4. 3
5. 1
6. 2
7. 4
8. 5
9. 6
10. 7
11. 9
12. 8
13. 9
14. 12
15. 11

Figure 2:
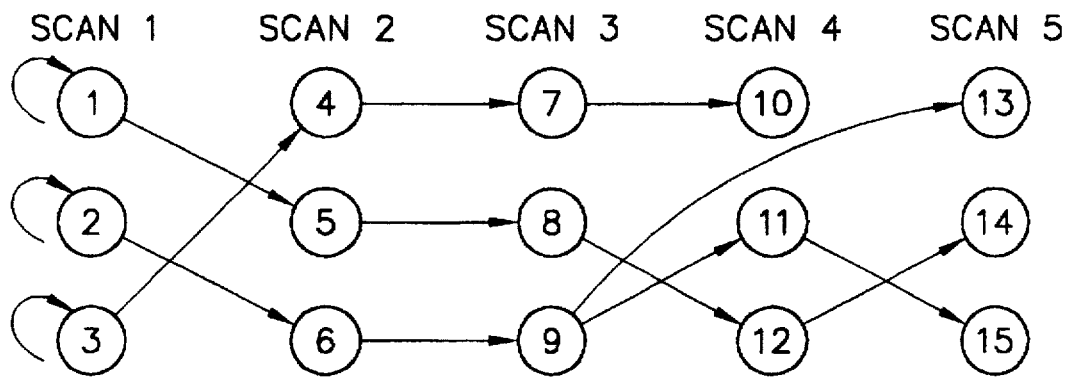
FIG. 2 shows the list of associations of Example 2 decoded as tracks.

As shown in FIG. 2, the string is decoded into 4 tracks comprised of the points (1,5,8,12,14), (2,6,9,11,15), (2,6,9, 13) and (3,4,7,10). The physical interpretation of the track assignments will be determined by the particular algorithms used. One possible interpretation of the tracks in example 2 is that an object, first detected at point 2, split into two pieces after point 9, with one part observed at points 11 and 15 and the other observed at point 13.

In examples 1 and 2, the numbering system starts at 1 and it is assumed that there are no data points prior to the start of the window. In general, some points in the current window will be continuations of tracks that started before the start of the window. Some of the array elements may represent indices of points outside the window, increasing the number of possible hypotheses.

While the possible search space of N! is truly vast, in practice, many of these hypotheses will correspond to physically impossible events. For instance, some points may be too far apart in space to belong to the same object. The search space may be significantly reduced by constraining the tracker to only generate and test hypotheses in which all of the associations have passed some simple gating tests (such as not requiring a velocity above a certain threshold).

Genetic Algorithm

Each individual within the population is encoded as a string of numbers as in examples 1 and 2 above. The fitness of each individual is the score of the hypothesis. New individuals are formed through crossover and mutation operations.

The Crossover operation generates new individuals from parents A and B. In the first, a cross point is selected randomly and two children are formed. The first child matches parent A before the crosspoint and parent B after the crosspoint. The second child matches parent B before the crosspoint and parent A after.

Two mutations operations are allowed. In single point mutation, the value of one point on the string is altered. In two point mutation, the values of two points on the string are transposed.

Constraints

All trackers must have explicitly or implicitly within them a model for which kinds of hypotheses can be allowed. The model should reflect the expected context or environment in which the tracker will operate. For instance, a tracker dealing with sensor reports from aircraft equipped with transponders might incorporate a constraint that no single report could belong to more than one track. In this instance, the treatment described above would tend to generate many individuals whose hypotheses would be disallowed. The gating requirement described above is another example of a context based constraint. In the preferred embodiment, the mutation and crossover routines incorporate tests for constraint violations and produce only individuals with allowable hypotheses to be constructed.

Local Improvement Operator

It is advantageous to include a local improvement operator which acts on some of the individuals in the population. This operator tests the possible mutation operations (described above) for an individual. When a mutation is found that would improve the individual's fitness, that mutation is made and the process continues for as long as improvements can be found. When no further improvement through a single mutation can be found, the hypothesis is at a local, but not necessarily global, optimum.

Because of the high computational cost of the operator and the risk of losing variety across the population, this operator should only be performed on a small fraction, for example, three per cent, of the individuals in each generation.

The Tracker Program

When the tracker is first turned on, there are no prior points to consider, there are no points in the window, and there is nothing for the tracker to do. At some scan in the future, some points are reported. A gating function is performed to determine which of the points in the window could be allowed to be associated with each other. A population is formed randomly based on permissible associations. Each individual is decoded into a hypothesis and scored. It may be that none of the points are allowed to associate with any point other than themselves in which case the population would represent many identical hypotheses in which all points are the start of new tracks. The GA is called to operate on the population until a fixed number of generations have been completed, or the difference in fitness between the fittest individual and the average for the population falls below a threshold, or the process is interrupted by the arrival of a new scan of data. The hypothesis of the fittest individual is reported as the hypothesis for that scan (although later hypotheses may amend it based on additional data).

If the next scan contains more reports, then a gating operation is performed to determine which points within the window may possibly be associated with each other, and a new population is formed by taking the individuals of the old population and extending them to include (random but allowed) associations for the new points. This new extended population is operated on by the GA once more.

After 5 scans of data, the window is fill and must slide forward to include the next scan. The individual with the highest score (the best hypothesis) is used to calculate the fixed hypothesis for scan 1. The fixed hypothesis for scan 1 is constructed using the assignments in the best hypothesis for points with times before the end of scan 1.

This individual has the highest score for scan 5 but may or may not have the hypothesis with the highest score at scan 1. The fixed hypothesis for scan 1 may be different than the original hypothesis reported by the tracker and may in fact have a worse score. The fact that selecting a hypothesis with a relatively poor score at an early scan may lead to a hypothesis with an optimum (or at least better than would be possible otherwise) score at a later scan is the reason for performing multiscan optimization.

Once the fixed hypothesis is formed, the crossover operation is performed between the best individual and the rest of the population to create a new population in which all of the individuals have identical associations for all points prior to the end of scan 1. (This step is important in the case where certain combinations of associations in the fixed hypothesis and associations in individuals in the population could violate constraints.) The genome of all the individuals are then truncated so as not to include associations for points prior to the end of scan 1.

The new points from scan 6 are then used to extend the genomes of the individuals in the population and the GA is invoked once more. While the associations for points before the start of the window may not be changed, points within the window may have associations with points outside.

The tracker continues in this manner indefinitely. The genomes of the individuals will be longer or shorter from one window to the next depending on how many points were generated over the scans in the window. At the start of each new scan, the tracker produces an output hypothesis which may or may not amend some of the associations in hypotheses output at previous scans.

Because of the computationally expensive nature of this process, the preferred embodiment spreads the GA across several parallel processors using the "island" model (familiar to those skilled in the art of GA programming. See, for example, D. Goldberg, Genetic Algorithms in Search, Optimization, and Machine Learning (Addison-Wesley, Reading, Mass., 1989). It should be noted that since each hypothesis is calculated independently of the others, the communications requirements between parallel processors can be very low.

The Evolutionary Program Embodiment

An Evolutionary Program (EP) is an artificial intelligence technique similar to a GA. The primary difference is that in an EP, there is no crossover operation, only mutation. In one embodiment of the invention, the intelligent search algorithm is an EP. In the EP embodiment, most parts would remain substantially the same, except that the mechanics of the EP would replace those of the GA. Additionally, the crossover operation would only be employed to reconcile the population with the first scan of the best hypothesis when the window slides forwards. The representation of the hypotheses and the two mutation operators described for the GA would be used for the EP.

Figure 3:
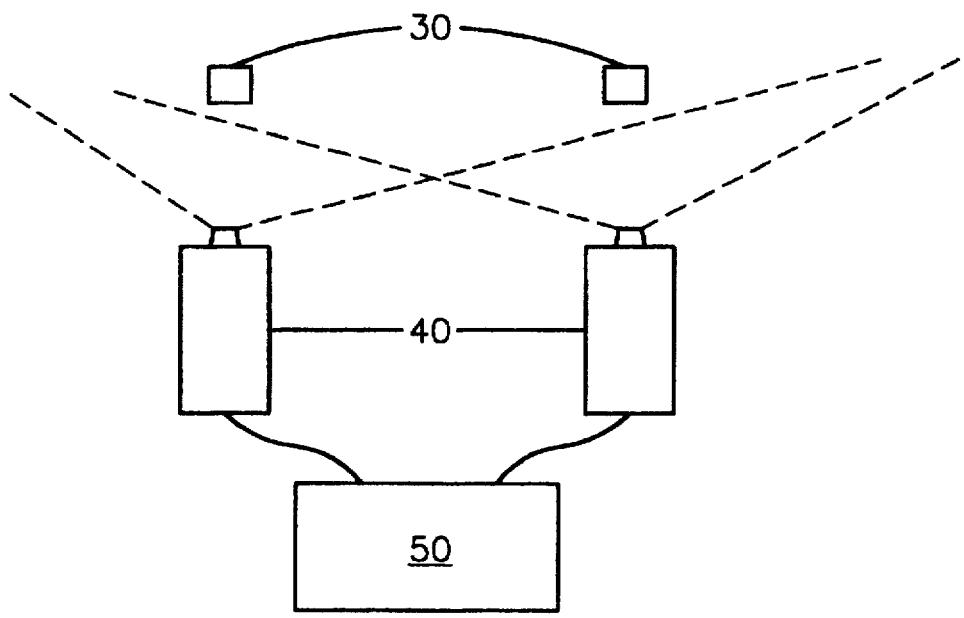
FIG. 3 is a schematic representation of an apparatus according to the invention.

FIG. 3 is a schematic diagram of the apparatus of the invention. In FIG. 3, the objects 30 are tracked by sensors 40. Reports from the sensors 40 are sent to the computer 50, where the reports are processed.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A method of tracking at least one object, comprising:
 receiving sensor reports from at least one sensor over a window comprised of multiple time scans;
 formulating hypotheses as lists of associations between the sensor reports;
 constructing at least one track for each of the hypotheses;
 scoring each of the hypotheses;
 searching through a portion of the hypotheses, using an intelligent search algorithm, to find a good hypothesis; and determining, using a computer, a state of the at least one object.

2. The method of claim 1, wherein the intelligent search algorithm is a genetic algorithm (GA) and further comprising forming a genotype for the genetic algorithm (GA) using the lists of associations such that a population in the GA comprises a group of the lists.

3. The method of claim 2, further comprising forming additional lists of associations using at least one of a crossover operation and a mutation operation.

4. The method of claim 3, wherein the crossover and mutation operations include a gating test to eliminate undesirable hypotheses.

5. The method of claim 2, further comprising testing mutation operations for some of the portion of the hypotheses, using a local improvement operator.

6. The method of claim 1, wherein the intelligent search algorithm is an evolutionary program.

7. The method of claim 1, wherein the good hypothesis is an optimal hypothesis across the window of multiple time scans.

8. The method of claim 1, wherein multiple objects are tracked and further comprising detaining, using the computer, states of the multiple objects.

9. The method of claim 1, wherein the method is performed over a sliding window of multiple time scans.

10. The method of claim 1, wherein the formulating step includes the step of subjecting the hypotheses to a gating test to eliminate undesirable hypotheses.

11. The method of claim 1, further comprising:

forming a second window of multiple time scans that overlaps the window;

receiving additional sensor reports from at least one sensor over the second window;

formulating new hypotheses as lists of associations between a portion of the sensor reports and the additional sensor reports;

constructing at least one track for each of the new hypotheses;

scoring each of the new hypotheses;

searching through a portion of the new hypotheses, using an intelligent search algorithm, to find a second good hypothesis; and determining, using a computer, a second state of the at least one object.

12. The method of claim 11, further comprising repeating the steps of the claim for multiple windows.

13. The method of claim 1, further comprising:

forming a second window of multiple time scans that overlaps the window;

receiving additional sensor reports from at least one sensor over the second window;

modifying the hypotheses to add associations for the additional sensor reports and delete associations for the sensor reports that are outside the second window;

constructing at least one track for each of the modified hypotheses;

scoring each of the modified hypotheses;

searching through a portion of the modified hypotheses, using an intelligent search algorithm, to find a second good hypothesis; and determining, using the computer, a second state of the at least one object.

14. An apparatus for tracking at least one object, comprising:

means for receiving sensor reports from at least one sensor over multiple time scans;

means for formulating hypotheses as lists of associations between the sensor reports;

means for constructing at least one track for each of the hypotheses;

means for scoring each of the hypotheses;

means for searching through a portion of the hypotheses, using an intelligent search algorithm, to find a good hypothesis; and computer means for determining a state of the at least one object.

15. The apparatus of claim 14, wherein the intelligent search algorithm is a genetic algorithm (GA) and further comprising means for forming a genotype for the genetic algorithm (GA) using the lists of associations such that a population in the GA comprises a group of the lists.

16. The apparatus of claim 15, further comprising means for forming additional lists of associations using at least one of a crossover operation and a mutation operation.

17. The apparatus of claim 15, further comprising means for testing mutation operations for some of the portion of the hypotheses, using a local improvement operator.

18. The apparatus of claim 14, wherein the intelligent search algorithm is an evolutionary program.

19. The apparatus of claim 14, wherein the means for formulating includes means for subjecting the hypotheses to a gating test to eliminate undesirable hypotheses.

20. A method of tracking at least one point on an object, comprising:

receiving sensor reports from at least one sensor over multiple time scans;

formulating hypotheses as lists of associations between the sensor reports;

constructing at least one track for each of the hypotheses;

scoring each of the hypotheses;

searching through a portion of the hypotheses, using an intelligent search algorithm, to find a good hypothesis; and determining, using a computer a state of the at least one point.

\* \* \* \* \*